United States Patent [19]

Burnier

[11] Patent Number: 5,025,048

[45] Date of Patent: Jun. 18, 1991

[54] ORGANOSILICON COMPOSITION COMPRISING STABILIZER

[75] Inventor: Julia S. Burnier, Wilmington, Del.

[73] Assignee: Hercules Incorporated, Wilmington, Del.

[21] Appl. No.: 508,323

[22] Filed: Apr. 12, 1990

[51] Int. Cl.$^5$ .............................................. G08K 5/3435
[52] U.S. Cl. ........................................ 524/99; 524/102
[58] Field of Search ................................. 524/99, 102

[56] References Cited

U.S. PATENT DOCUMENTS

| 4,198,334 | 4/1980 | Rasberger | 106/176 |
| 4,877,820 | 10/1989 | Cowan | 523/222 |
| 4,900,779 | 2/1990 | Leibfried | 524/862 |
| 4,902,731 | 2/1990 | Leibfried | 523/222 |

Primary Examiner—Kriellion Morgan
Attorney, Agent, or Firm—Mark D. Kuller

[57] ABSTRACT

A composition comprising (A) (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites; or (ii) a crosslinked or crosslinkable linear poly(organohydrosiloxane) polymer having a least 30% of its ≡SiH groups reacted to hydrocarbon residues derived from polycyclic polyenes having at least two carbon-carbon double bonds in their rings; and (B) as an antioxidant, a compound comprised of at least one hindered phenol and at least one hindered amine; and the process of making the same, are disclosed.

20 Claims, No Drawings

ORGANOSILICON COMPOSITION COMPRISING STABILIZER

This invention is directed to use of compounds comprised of at least one hindered phenol group and at least one hindered amine group as antioxidants for stabilizing certain organosilicon polymers and prepolymers. The organosilicon polymers and prepolymers are comprised of (a) hydrocarbon residues derived from polycyclic polyenes and (b) residues derived from linear poly(organosiloxane)s, cyclic polysiloxanes or tetrahedral siloxysilanes.

BACKGROUND OF THE INVENTION

Leibfried, in U.S. Pat. Nos. 4,900,779, and 4,902,731, and U.S. patent application Ser. Nos. 07/419,429 (filed Oct. 10, 1989) and 07/419,430 (filed Oct. 10, 1989), and Bard and Burnier, in U.S. patent application Ser. No. 07/422,214 (filed Oct. 16, 1989) describe crosslinked organosilicon polymers and crosslinkable organosilicon prepolymers comprised of alternating polycyclic hydrocarbon residues and cyclic polysiloxanes or siloxysilane residues linked through carbon to silicon bonds. Cowan, in U.S. Pat. No. 4,877,820, discloses crosslinked or crosslinkable linear poly(organohydrosiloxane) polymers having at least 30% of their ≡SiH groups reacted with hydrocarbon residues derived from polycyclic polyenes.

These polymers and prepolymers are often stored over long periods of time. In addition, the prepolymers are often cured at high temperatures and the polymers are often exposed to high temperatures during use. They contain residual ≡Si—H groups and carbon-carbon double bonds which cause them to be thermally unstable, particularly over long periods of time and especially at elevated temperatures. The instant inventor has discovered that the crosslinked organosilicon polymers and prepolymers can be stabilized using compounds comprised of at least one hindered phenol and at least one hindered amine.

SUMMARY OF THE INVENTION

Accordingly, this invention is directed to a composition comprising:

(A) (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites; or (ii) a crosslinked or crosslinkable linear poly(organohydrosiloxane) polymer having at least 30% of its ≡SiH groups reacted to hydrocarbon residues derived from polycyclic polyenes having at least two carbon-carbon double bonds in their rings; and (B) as an antioxidant, a compound comprised of at least one hindered phenol and at least one hindered amine.

DETAILED DESCRIPTION OF THE INVENTION

Herein, "SiH" is be used to describe hydrosilation reactable ≡SiH groups.

Any cyclic polysiloxane or tetrahedral siloxysilane with two or more hydrogen atoms bound to silicon can be used to form the crosslinked organosilicon polymer or hydrosilation crosslinkable organosilicon prepolymer (A) (i). Cyclic polysiloxanes useful in forming the products of this invention have the general formula:

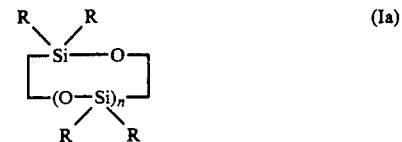

(Ia)

wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms in the molecule.

Examples of reactants of Formula (Ia) include, e.g., tetra- and penta-methylcyclotetrasiloxanes; tetra-, penta-, hexa- and hepta-methylcyclopentasiloxanes; tetra-, penta- and hexa-methylcyclohexasiloxanes, tetraethyl cyclotetrasiloxanes and tetraphenyl cyclotetrasiloxanes. Preferred are 1,3,5,7-tetramethylcyclotetrasiloxane, 1,3,5,7,9-pentamethylcyclopentasiloxane and 1,3,5,7,9,11-hexamethylcyclohexasiloxane, or blends thereof.

The tetrahedral siloxysilanes are represented by the general structural formula:

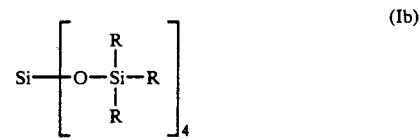

(Ib)

wherein R is as defined above and is hydrogen on at least two of the silicon atoms in the molecule.

Examples of reactants of Formula (Ib) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

Polymers and prepolymers made with cyclic polysiloxanes or tetrahedral siloxysilanes may also contain other hydrosilation reactable polysiloxanes bearing two or more SiH groups. For instance, they may contain linear, short chain SiH terminated polysiloxanes having the general formula:

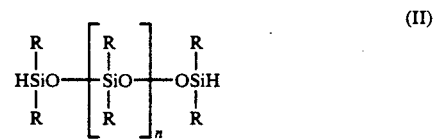

(II)

wherein n is 0 to 1000 and R is alkyl or aryl, preferably methyl or phenyl, as described by Leibfried in U.S. patent application Ser. Nos. 07/419,429 and 07/419,430, supra. These linear, short chain SiH terminated polysiloxanes impart flexibility to the cured polymers and can be used to produce elastomers.

The linear poly(organohydrosiloxane) preferably has the general formula:

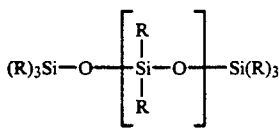

(III)

wherein R is a substituted or unsubstituted, saturated alkyl radical or a substituted or unsubstituted phenyl radical, and about 5% to about 50% of the R's are hydrogen and m is an integer from about 3 to 100, and the maximum value of m is preferably 40.

Exemplary linear poly(organohydrosiloxanes) include:
trimethylsiloxy-terminated dimethylsiloxanemethylhydrosiloxane copolymer,
dimethylsiloxy-terminated dimethylsiloxanemethylhydrosiloxane copolymer,
dimethylsiloxy-terminated polydimethylsiloxane,
trimethylsiloxy-terminated methyloctylsiloxane-methylhydro-siloxane copolymer,
dimethylsiloxy-terminated phenylmethylsiloxane-methylhydro-siloxane copolymer,
trimethylsiloxy-terminated methylcyanopropyl-siloxane-methylhydrosiloxane copolymer,
trimethylsiloxy-terminated 3,3,3-trifluoropropyl-methylsiloxane methylhydrosiloxane copolymer,
trimethylsiloxy-terminated 3-aminopropylmethyl siloxane-methylhydrosiloxane copolymer,
trimethylsiloxy-terminated 2-phenylethylmethyl siloxane-methylhydrosiloxane copolymer, and
trimethylsiloxy-terminated 2-(4-methylphenyl)-ethylmethyl-siloxane-methylhydrosiloxane copolymer.

Polycyclic polyenes useful in preparing the composition of this invention are polycyclic hydrocarbon compounds having at least two non-aromatic, carbon-carbon double bonds. Illustrative are compounds selected from the group consisting of cyclopentadiene oligomers (e.g., dicyclopentadiene, tricyclopentadiene and tetracyclopentadiene), norbornadiene dimer, dimethanohexahydronaphthalene, bicycloheptadiene (i.e., norbornadiene) and its Diels-Alder oligomers with cyclopentadiene (e.g., dimethanohexahydronaphthalene), and substituted derivatives of any of these, e.g., methyl dicyclopentadienes. Preferred are cyclopentadiene oligomers, such as dicyclopentadiene and tricylopentadiene. Two or more polycyclic polyenes can be used in combination.

Other hydrocarbon compounds may also be used. For instance, according to one embodiment described in U.S. patent application Ser. No. 07/422,214, supra, the hydrocarbon component comprises (a) at least one low molecular weight (typically having a molecular weight less than 500) polyene having at least two non-aromatic carbon-carbon double bonds highly reactive in hydrosilation (they may contain other less reactive (including unreactive) double-bonds, provided that those double bonds do not interfere with the reactivity of the highly reactive double bonds; but, compounds having only two highly reactive double bonds are preferred), the carbon-carbon double bonds being either in an alpha, beta or gamma position on a linear carbon moiety, next to two bridgehead positions in a strained polycyclic aliphatic ring structure, or in a cyclobutene ring, and (b) at least one polycyclic polyene having at least two chemically distinguishable non-aromatic, non-conjugated carbon-carbon double bonds in its rings. Examples of component (a) include 5-vinyl-2-norbornene, o-, m- or p-diisopropenylbenzene, o-, m- or p-divinylbenzene, diallyl ether, diallyl benzene, dimethanohexahydronaphthalene and the symmetrical isomer of tricyclopentadiene. By "having at least two chemically distinguishable carbon-carbon double bonds" it is meant that at least two carbon-carbon double bonds have widely different rates of reaction in hydrosilation and that one of the double bonds will react prior to substantial reaction of the other double bond(s). This first double bond must be quite reactive in hydrosilation. Reactive double bonds include those that are next to two bridgehead positions in a strained polycyclic aliphatic ring structure or in a cyclobutene ring, as per component (a) of the embodiment described directly above. The other carbon-carbon double bond(s) may be any other non-aromatic, 1,2-disubstituted non-conjugated carbon-carbon double bond that is not next to two bridgehead positions in a strained polycyclic aliphatic ring structure and is not in a cyclobutene ring. Exemplary are dicyclopentadiene and the asymmetrical isomer of tricyclopentadiene. Preferred, for some applications, when using these hydrocarbon compounds are cyclic polysiloxanes containing three or more SiH groups.

The reactions for forming the organosilicon prepolymers and polymers of this invention are described in U.S. patent application Ser. Nos. 07/419,429, 07/419,430 and 07/422,214, and U.S. Pat. Nos. 4,877,820, 4,900,779 and 4,902,731, supra. The reactions for forming the prepolymer and for forming a polymer from the prepolymer can be promoted thermally or by the addition of a hydrosilation catalyst or radical generators such as peroxides and azo compounds. Hydrosilation catalysts include metal salts and complexes of Group VIII elements. The preferred hydrosilation catalysts contain platinum (e.g., PtCl$_2$, dibenzonitrile platinum dichloride, platinum on carbon, etc.). The preferred catalyst, in terms of both reactivity and cost, is chloroplatinic acid (H$_2$PtCl$_6$ 6H$_2$O). Catalyst concentrations of 0.0005 to about 0.05% by weight of platinum, based on the weight of the monomers, are preferred.

To prepare the thermoset and thermoplastic polymers, several approaches are available. It is possible, by selection of reactants, reactant concentrations and reaction conditions, to prepare polymers exhibiting a broad range of properties and physical forms. Thus, it has been found possible to prepare tacky solids, elastomeric materials, and tough glassy polymers.

In one approach, the correct relative ratios of reactants and the platinum catalyst are simply mixed and brought to a temperature at which the reaction is initiated and proper temperature conditions are thereafter maintained to drive the reaction to substantial completion (typically, with a ratio of carbon-carbon double bonds to SiH groups of about 1:1, when 70 to 90% of the SiH groups are consumed).

Generally, with cyclic polysiloxanes or tetrahedral siloxysilanes, thermoset polymers result when the ratio of carbon-carbon double bonds of (b) to SiH groups in (a) is in the range of from about 0.5:1 up to about 1.2:1, more preferably from about 0.8:1 up to about 1.1:1. The alternating residues form a cross-linked thermoset structure. Thermoplastic polymers result when the ratio of carbon-carbon double bonds in the rings of (b) to SiH groups in (a) is greater than 1.2:1 and up to 1.8:1.

B-stage type prepolymers can be prepared as disclosed in U.S. patent application Ser. No. 07/422,214, and U.S. Pat. Nos. 4,877,820 and 4,902,731, supra. Generally, the initial product of the reaction at lower temperatures, e.g., about 25° to about 80° C., is a crosslinkable prepolymer, which may be in the form of a solid or a flowable, heat-curable liquid, even though the ratio of carbon-carbon double bonds to SiH groups is otherwise suitable for cross-linking. The prepolymers generally have 30 to 70% of the SiH groups reacted, and when liquids are desired preferably about 30 to 60% of the SiH groups reacted. Such prepolymers, analogous to the so-called B-stage resins encountered in other thermoset preparations, can be recovered and subsequently transferred to a mold for curing.

These prepolymers are prepared using polycyclic polyenes having at least two chemically distinguishable non-aromatic, non-conjugated carbon-carbon double bonds in their rings. Illustrative are compounds selected from the group consisting of dicyclopentadiene, asymmetrical tricyclopentadiene, and methyl dicyclopentadiene, and substituted derivatives of any of these. Preferred is dicyclopentadiene. Such prepolymers can also be prepared with the hydrocarbon combinations described in U.S. patent application Ser. No. 07/422,214, supra.

The prepolymers, including the viscous, flowable liquid prepolymers, are stable at room temperature for varying periods of time, and cure upon reheating to an appropriate temperature, e.g., about 100° to about 250° C. Often, additional catalyst is added to the prepolymer prior to cure to further promote the reaction.

A second type of prepolymer can be prepared by a process described in U.S. patent application Ser. Nos. 07/419,429 and 07/419,430. In this process, an olefin rich prepolymer is prepared by reacting a large excess of polycyclic polymers with cyclic siloxanes or tetrahedral siloxysilanes. The olefin rich organosilicon prepolymer is blended with additional cyclic polysiloxane or tetrahedral siloxysilane before cure.

According to this process, organosilicon prepolymers are made with a large excess of carbon-carbon double bonds available for reaction with SiH groups. That is, the ratio of carbon-carbon double bonds in the rings of the polycyclic polyenes used to form the polycyclic polyene residues (a) to SiH groups in the cyclic polysiloxanes and tetrahedral siloxysilanes used to form the cyclic polysiloxane or tetrahedral siloxysilane residues (b) is greater than 1.8:1, preferably greater than 1.8:1 and up to 2.2:1.

The prepolymers of this embodiment are generally in the form of flowable liquids, which are stable at room temperature. The most stable prepolymers are formed at a double bond to SiH ratio of about 2:1 since virtually all polyene is reacted and excess polycyclic polyene need not be removed. (Due to their odor, the presence of unreacted polycyclic polyenes is undesirable. When necessary or desirable, unreacted polycyclic polyenes can be stripped, e.g., using a rotoevaporator, to form odorless compositions.)

Later, crosslinked polymers are formed by mixing the prepolymers with the polysiloxanes/siloxysilanes such that the total ratio of non-aromatic, non-conjugated carbon-carbon double bonds in the rings of the polycyclic polyenes used to form the polycyclic polyene residues (a) to SiH groups in the polysiloxanes and siloxysilanes used to form the polysiloxane/siloxysilane residues (b) is in the ratio of 0.4:1 to 1.7:1; preferably 0.8:1 to 1.3:1, most preferably about 1:1, and curing the mixture in the presence of a hydrosilation catalyst.

Preferably, according to this embodiment, the organosilicon prepolymers are reacted with the polysiloxanes and/or siloxysilanes to form a crosslinked polymer in a mold. The prepolymers and polysiloxanes/siloxysilanes are stored separately and are blended before entering the mold. The hydrosilation catalyst may be present in either or both stream(s) or injected directly into the mixer. The reaction is exothermic and proceeds rapidly so that the polymer gels and the product can be removed from the mold in minutes. The components of the blends are completely stable until they are mixed. This permits indefinite ambient storage of the materials.

Alternately, the blend components can be premixed and stirred in a tank. These blends have low viscosity and are pumpable. Addition of catalyst and/or application of heat can be used to cure the prepolymer composition. The reaction may be carried out in an extruder, mold or oven, or the blend may be applied directly on a substrate or part.

With all of the above processes, the reaction speed and its accompanying viscosity increase can be controlled by use of a cure rate retardant (complexing agent), such as N,N,N',N'-tetramethylethylenediamine, diethylenetriamine or phosphorus compounds.

A number of options exist for incorporating additives into the prepolymers or polymers of this invention. Additives such as fillers and pigments are readily incorporated. Carbon black, vermiculite, mica, wollastonite, calcium carbonate, sand, glass spheres, glass beads, ground glass and waste glass are examples of fillers which can be incorporated. Fillers can serve either as reinforcement or as fillers and extenders to reduce the cost of the molded product. Glass spheres are useful for preparing low density composites. When used, fillers can be present in amounts up to about 80%.

Fiber reinforced composites may be made with the prepolymers of this invention. They can contain as much as 80%, preferably 30 to 60%, by weight, of fibrous reinforcement. Fibrous reinforcement useful in this invention includes glass, etc., as described in U.S. Pat. Nos. 4,900,779 and 4,902,731.

The polymers of this invention have excellent electrical insulating properties and resistance to moisture. Often, they have high glass transition temperatures.

The polymers and prepolymers of this invention are well-suited for electronic applications, e.g., composites, adhesives, encapsulants, potting compounds and coatings. They are especially useful for preparing laminates, such as those used for printed circuit boards.

An elastomer can be added to improve toughness. Preferred are hydrocarbon elastomers having a molecular weight of less than 100,000 and low molecular weight siloxane elastomers. Exemplary hydrocarbon elastomers are low molecular weight ethylene-propylene-diene terpolymers, low molecular weight butyl rubber, partially hydrogenated low molecular weight polyisoprene or natural rubber, and partially hydrogenated low molecular weight polybutadiene or styrene-butadiene copolymers. Exemplary siloxane rubbers include low molecular weight vinyl or SiH terminated polydimethyl/diphenyl siloxane copolymers. Preferred are low molecular weight ethylene-propylene-dicyclopentadiene and ethylene-propylene-ethylidenenorborene polymers having a molecular weight of 5500 to 7000. Most preferred is Trilene 65 elastomer (Uniroyal, Middlebury, Conn.). Elastomers are generally used in an amount of 0.5 to 20%, preferably 2 to 15%, and most preferably 3 to 12%, by weight of the total composition.

Higher levels may be useful in some applications. Elastomers may be added to the monomers or to a prepolymer.

The compounds useful in stabilizing the organosilicon materials of this invention are comprised of at least one hindered phenol and at least one hindered amine. Preferred are the substituted malonic acid derivatives described by Rasberger in U.S. Pat. No. 4,198,334. These compounds have the formula (IV):

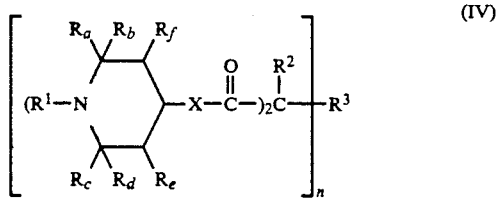
(IV)

and the acid addition salts thereof, wherein
n is 1 or 2,
$R_a$ represents alkyl having 1-6 carbon atoms,
$R_b$ represents alkyl having 1-6 carbon atoms,
$R_c$ represents alkyl having 1-9 carbon atoms, phenyl, benzyl or phenylethyl,
$R_d$ represents alkyl having 1-6 carbon atoms, or
$R_c$ and $R_d$ together represent tetra- or pentamethylene,
$R_e$ represents hydrogen, alkyl having 1-5 carbon atoms, alkenyl or alkynyl having 3-4 carbon atoms or aralkyl having 7-8 carbon atoms,
$R_f$ represents hydrogen, alkyl having 1-5 carbon atoms, alkenyl or alkynyl having 3-4 carbon atoms, or aralkyl having 7-8 carbon atoms, with $R_e$ and $R_f$ being mutually exchangeable, and
X represents oxygen or —NR—,
R represents hydrogen, alkyl having 1-18 carbon atoms, alkenyl having 3-4 carbon atoms, alkynyl having 3-4 carbon atoms, cycloalkyl having 5-12 carbon atoms, aryl having 6-10 carbon atoms, or aralkyl having 7-9 carbon atoms,
$R^1$ represents hydrogen, —O, alkyl having 1-12 carbon atoms, alkenyl having 3 or 4 carbon atoms, propargyl, benzyl or a group of the formula —CH$_2$—CH(OR$^5$)—R$^4$ wherein $R^4$ represents hydrogen, methyl or phenyl and $R^5$ represents hydrogen or a group A—CO—, or $R^1$ represents a group A—CO—, and in both cases A represents alkyl having 1-12 carbon atoms, alkenyl having 2 or 3 carbon atoms, cyclohexyl, phenyl, benzyl, a phenyl or phenylethyl group substituted by 2 alkyl groups each having 1-4 carbon atoms, alkylamino having 1-12 carbon atoms, dialkylamino having 2-16 carbon atoms, anilino, alkoxy having 1-12 carbon atoms, benzyloxy or phenoxy,
$R^2$ represents a hydroxybenzyl group of the formula (V):

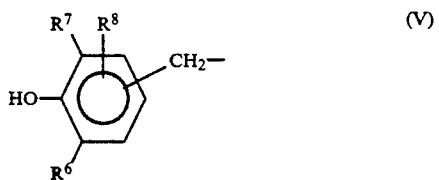
(V)

wherein $R^6$ and $R^7$ each independently represent an alkyl group having 1-9 carbon atoms, aralkyl having 7-9 carbon atoms or cycloalkyl having 5-8 carbon atoms, and $R^8$ represents hydrogen or methyl, and $R^3$ represents, in the case where n is 1, alkyl having 1-20 carbon atoms, or alkyl having 1-10 carbon atoms which is substituted by one or more of the groups —OR$^9$, —CO—R$^{11}$, —CN, —C(O)—YR$^{12}$, —O—C(O)R$^{13}$ or —P(O)(OR$^{14}$)$_2$, wherein
$R^9$ denotes phenyl or alkylphenyl having 7-10 carbon atoms, benzyl or cyclohexyl,
$R^{11}$ denotes alkyl having 1-12 carbon atoms,
Y denotes oxygen or —NR—, whereby R has the above-given meaning,
$R^{12}$ denotes alkyl having 1-18 carbon atoms, cycloalkyl having 5-12 carbon atoms, or a group of the formula (VI)

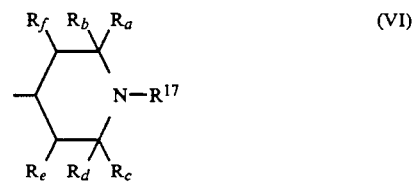
(VI)

wherein $R^{17}$ has one of the meanings given for $R^1$, $R^{13}$ denotes alkyl having 1-17 carbon atoms, cycloalkyl having 5-12 carbon atoms, or phenyl or phenylalkyl having 7-9 carbon atoms, whereby the phenyl radical can be substituted by alkyl having 1-4 carbon atoms and/or hydroxyl, and
$R^{14}$ denotes alkyl having 1-8 carbon atoms, allyl or phenyl, and X has the above-defined meaning, and
$R^3$ further represents an alkyl group having 2-22 carbon atoms which is interrupted by —O—, —SO— or —SO$_2$, alkenyl having 3-18 carbon atoms, alkynyl having 3-8 carbon atoms, cycloalkyl having 5-12 carbon atoms, alkyl-cycloalkyl having 6-18 carbon atoms, cycloalkyl-alkyl having 6-14 carbon atoms, aralkyl or alkyl-aralkyl having 7-19 carbon atoms, phenyl or a group —OR—$^{15}$, whereby $R^{15}$ can be alkyl having 1-18 carbon atoms, alkenyl having 3-4 carbon atoms, alkynyl having 3-4 carbon atoms, cycloalkyl having 5-12 carbon atoms or aralkyl having 7-9 carbon atoms, or $R^3$ represents a group —O—C(O)R$^{16}$ or —N—H—C(O)R$^{16}$, whereby $R^{16}$ can be alkyl having 1-12 carbon atoms, alkenyl having 2 or 3 carbon atoms, cyclohexyl, phenyl, benzyl, a phenyl or phenylethyl group substituted by 2 alkyl groups each having 1-4 carbon atoms and a hydroxyl group, or $R^3$ is a group of the formula (VI) or of the formula (VII)

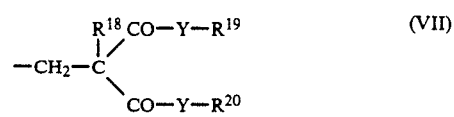
(VII)

wherein $R^{18}$ represents alkyl having 1-20 carbon atoms, allyl, benzyl, phenyl, cyclohexyl, alkoxyalkyl having 3-8 carbon atoms, or a group —O—C(O)R$^{16}$ or —N—H—C(O)R$^{16}$ as defined above, or has one of the meanings given for $R^2$, and $R^{19}$ and $R^{20}$ each independently represent alkyl having 1-6 carbon atoms, or a radical of the formula (VI), and, in addition,
$R^3$ represents, in the case where n is 2, a direct bond, alkylene having 1-20 carbon atoms, alkylene having 2-20 carbon atoms which is interrupted by one or two of the members —O—, —SO—, —SO—$_2$ or —CO—O—, arylene-bis-alkylene having 8-14 carbon atoms, alkylene having 4–8 carbon atoms or alkynylene having 4–8 carbon atoms.

$R_a$, $R_b$ and $R_d$ can be straight-chain or branched-chain alkyl groups having 1–6 carbon atoms, such as methyl, ethyl, propyl, butyl, isobutyl, isopentyl or n-hexyl.

$R_c$ can be a straight-chain or branched-chain alkyl group having 1–9 carbon atoms, such as methyl, ethyl, propyl, n-butyl, isobutyl, isopentyl, n-hexyl, 2-ethylhexyl, n-nonyl or isononyl.

$R_e$ and $R_f$ can be alkyl groups having up to 5 carbon atoms, with $R_e$ preferably containing 1 carbon atom less than $R_b$ and the position of $R_e$ and $R_f$ being exchangeable. $R_e$ and $R_f$ can also represent alkenyl or alkynyl, for example allyl, methallyl, 2-butenyl or propargyl, especially allyl. $R_e$ and $R_f$ can also represent aralkyl, for example benzyl, phenylethyl or methylbenzyl, preferably benzyl.

Preferably $R_a$, $R_b$, $R_c$ and $R_d$ are methyl, and $R_e$ and $R_f$ are hydrogen.

$R^1$, $R^{16}$ and A as an alkyl group having 1–12 carbon atoms can be a primary alkyl group, such as a methyl, ethyl, n-propyl, n-butyl, n-hexyl, n-octyl, n-decyl or n-dodecyl group.

R and $R^{15}$ as alkyl having up to 18 carbon atoms can in addition be; e.g., tridecyl, hexadecyl or octadecyl.

R, $R^1$, $R^{15}$, $R^{16}$ and A as an alkenyl group can be, e.g., an allyl, methallyl or butenyl group.

R and $R^{15}$ as alkynyl having 3–4 carbon atoms can be, e.g., propargyl or methylpropargyl.

R and $R^{15}$ as cycloalkyl having 5–12 carbon atoms can be, e.g., cyclopentyl, cyclohexyl, cyclooctyl or cyclododecyl.

R as aryl can be, for example, phenyl tolyl or naphthyl.

R and $R^{15}$ as aralkyl can be, e.g., benzyl, phenylethyl or phenylpropyl.

If $R^1$ and/or $R^5$ represent a group A—CO—, then this can be, depending on the meaning of A, a carbonic acid radical such as acetyl, propionyl, butyryl, capronyl, caprylol, lauroyl, acryloyl, crotonoyl, phenylacetyl, beta-(3,5-di-tert.butyl-4-hydroxyphenyl)-propionyl or benzoyl; or a carbamoyl radical such as methylcarbamoyl, butylcarbamoyl, dodecylcarbamoyl, diethylcarbamoyl, dihexylcarbamoyl, dioctylcarbamoyl or phenylcarbamoyl; or a carbonic ester radical such as ethoxycarbonyl, isopropoxycarbonyl, 2-ethylhexyloxycarbonyl, dodecyloxycarbonyl, benzyloxycarbonyl or phenoxycarbonyl.

According to its definition by formula II, $R^2$ can be a para- or meta-hydroxybenzyl group. The substituents $R^6$ and $R^7$ on the benzyl radical can be straight-chain or branched-chain alkyl groups having 1–9 carbon atoms, e.g., methyl, ethyl, isopropyl, tert.butyl, n-hexyl, 1,1,3,3-tetramethylbutyl or tert.nonyl. In the case where $R^6$ or $R^7$ represent cycloalkyl, this can be, for example, cyclopentyl, methylcyclopentyl, cyclohexyl or methylcyclohexyl. Where $R^6$ or $R^7$ represents aralkyl, this can be, e.g., benzyl or alpha,alpha-dimethylbenzyl. $R^6$ and $R^7$ are preferably alkyl groups having 1–4 carbon atoms, especially methyl or tert.butyl.

Depending on the value of n, $R^3$ can be a mono- or bivalent organic radical. As alkyl having 1–20 carbon atoms, $R^3$ can be, e.g., one of the alkyl groups given above for $R^1$; it can also represent branched-chain alkyl such as isopropyl, isopentyl, 2-ethylbutyl, 2-ethylhexyl or isononyl, or higher alkyl radicals such as n-hexadecyl, n-octadecyl or n-eicosyl.

As a substituted or interrupted alkyl group, $R^3$ can be, for example, one of the following radicals: 2-phenoxyethyl, 2-benzyloxyethyl, 2-p-tolyloxypropyl, cyclohexyloxymethyl, 2,3-di(phenoxy)propyl, 2-acetylethyl, 2-isobutyrylethyl, 2-(dodecylcarbonyl)-ethyl, methoxycarbonylmethyl, dodecyloxy-carbonylmethyl, 2-ethoxycarbonylethyl, 1,2-di(methoxycarbonyl) ethyl, 2,3-di(ethoxycarbonyl)propyl, 2-(butylaminocarbonyl)ethyl, 2-(cyclohexyloxycarbonyl)-ethyl, 2-(tert.butyloxycarbonyl)-ethyl, 2-(octadecyloxycarbonyl)-propyl, 4-(propoxycarbonyl)-butyl, 2-acetoxyethyl, 1,2-diacetoxy-ethyl, 2-(isooctanoloxy)-propyl, 2-(octadecanoyloxy)-ethyl, 2-(cyclopentylcarbonyloxy)-ethyl, 3-benzoyloxypropyl, 2-(p-tert.butylbenzoyloxy)-ethyl, 2-salicyloyloxy-ethyl, 2-(3,5-di-tert.butyl-4-hydroxybenzoyloxy)-ethyl, 2-phenylacetyloxyethyl, 2-(3,5-di-tert.butyl-4-hydroxyphenylpropionyloxy)-propyl, methoxymethyl, 2-butoxyethyl, 2-octadecyloxyethyl, isopropoxymethyl, 2-octadecylsulphonyl-ethyl, 2-ethylsulphonyl-propyl, 2-(2,2,6,6-tetramethylpiperidin-4-yloxycarbonyl)-ethyl, 2-(1,2,2,6,6-pentamethylpiperidin-4-ylaminocarbonyl)-ethyl, 2-(2,2,6,6-tetramethylpiperidin-4-yloxycarbonyl)-2-(methoxy-carbonyl)-hexyl or 2,2-bis-(2,2,6,6-tetramethylpiperidin-4-ylaminocarbonyl-hexyl.

As an alkenyl or alkynyl group, $R^3$ can be, for example, allyl, methallyl, 2-buten-1-yl, 3-hexen-1-yl, undecenyl, oleyl, propargyl or 2-heptyn-1-yl.

Examples of $R^3$ as cycloalkyl, alkyl-cycloalkyl or cycloalkyl-alkyl are the radicals cyclopentyl, cyclo hexyl, cyclooctyl, cyclododecyl, methylcyclopentyl, dimethylcyclohexyl, propylcyclooctyl, hexylcyclododecyl, cyclohexylmethyl, 3-cyclooctylpropyl or decahydronaphthylmethyl.

Examples of $R^3$ as aralkyl or alkyl-aralkyl are the groups benzyl, 2-phenylethyl, 2-phenylpropyl, -naphthylmethyl, 4-methylbenzyl, 4-t-butylbenzyl or 4-methylnaphthyl-1-methyl.

$R^3$ as a group —O—CO—$R^{16}$ or —NH—CO—$R^{16}$ can be, for example, acetoxy, propionoxy, butyroxy, octanoyloxy, dodecanoyloxy, acryloxy, crotonoxy, benzoyloxy, phenylacetoxy, 3,5-di-tert.butyl-4-hydroxybenzoyloxy, acetamino, butyrylamino, decanoylamino, acroylamino, benzoylamino or cyclohexylcarbonylamino.

In the case where n is 2, $R^3$ represents a direct bond or a bivalent organic radical. This can be alkylene, e.g. methylene, ethylene or polymethylene having up to 20 carbon atoms; or the alkylene radical is interrupted by 1 or 2 hetero members, such as the bivalent radicals,
—CH$_2$O—CH$_2$—, —CH$_2$CH$_2$O—CH$_2$CH$_2$—,
—CH$_2$CH$_2$—O—CH$_2$CH$_2$—O—CH$_2$CH$_2$—,
—CH$_2$CH$_2$—SO—CH$_2$CH$_2$—,
—CH$_2$CH$_2$—SO$_2$—CH$_2$—CH$_2$CH$_2$—,
—CH$_2$CH$_2$—SO—$_2$—(CH$_2$)$_8$—SO$_2$—CH$_2$CH$_2$—,
—CH$_2$COOCH$_2$CH$_2$OOCCH$_2$—,
—CH$_2$CH$_2$COOCH$_2$CH$_2$OOCCH$_2$CH$_2$—,
—CH$_2$CH$_2$—COO(CH$_2$)$_4$—OOC—CH$_2$CH$_2$—,
—CH$_2$CH$_2$OCO(CH$_2$)$_4$COOCH$_2$CH$_2$— and
—CH$_2$CH$_2$OCO(CH$_2$)$_8$COOCH$_2$CH$_2$—.

$R^3$ can also be arylene-bis-alkylene, e.g. p-xylylene, benzene-1-3-bis(ethylene), diphenyl-4,4'-bis(methylene) or naphthalene-1,4-bis(methylene). It can, finally, be alkenylene or alkynylene having 4–8 carbon atoms, such as 2-butenylene-1,4, 2-butynylene-1,4 or 2,4-hexadiynylene-1,6.

Preferred compounds of formula (IV) are those wherein $R_a$ to $R_d$ are methyl, and $R_e$ and $R_f$ are hydrogen, or wherein $R_a$ and $R_c$ are ethyl, $R_b$, $R_d$ and $R_e$ are methyl, and $R_f$ is hydrogen. Also preferred are compounds of formula (IV) wherein X is oxygen or NH, $R^1$ is hydrogen, —O—, alkyl having 1–4 carbon atoms, allyl, propargyl, acetyl, acryloyl or crotonoyl, $R^2$ represents a hydroxybenzyl group of the formula (Va) or (Vb),

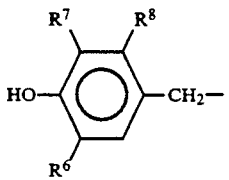

(Va)

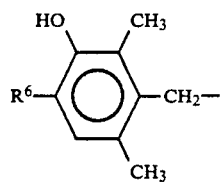

(Vb)

$R^6$ and $R^7$ each independently represent alkyl having 1 to 4 carbon atoms, $R^8$ represents hydrogen or methyl, $R^3$ represents in the case where n is 1 alkyl having 1–18 carbon atoms, alkyl having 1–4 carbon atoms which is substituted by one or two of the groups —C(O)—YR$^{12}$ or —O—C(O)R$^{13}$, wherein Y is —O— or —NH—, $R^{12}$ can be alkyl having 1–4 carbon atoms, or a group of the formula (VIb),

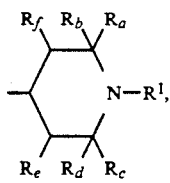

(VIb)

$R^{13}$ can be alkyl having 1–17 carbon atoms, cyclo hexyl, phenyl or benzyl, and $R^{14}$ can be alkyl having 1–4 carbon atoms or allyl, and $R^3$ further represents alkyl having 2–18 carbon atoms which is interrupted by —O— or cycloalkyl having 5–12 carbon atoms, alkylcycloalkyl having 6–18 carbon atoms, alkenyl having 3–6 carbon atoms, alkynyl having 3–6 carbon atoms, phenyl, aralkyl having 7–15 carbon atoms, or a group —OR$^{15}$, wherein $R^{15}$ represents alkyl having 1–12 carbon atoms, allyl, propargyl or benzyl, or a group —O—COR$^{16}$ or —NH—COR$^{16}$, wherein $R^{16}$ represents alkyl having 1–12 carbon atoms, phenyl, 3,5-di-tert.butyl-4-hydroxyphenyl or 2-(3,5-di-tert-.butyl-4-hydroxyphenyl)-ethyl, or a group of the formula IIIb, or in the case where n is 2 a direct bond, alkylene having 1–12 carbon atoms which can be interrupted by one or two of the groups —O— or —CO—O—, arylene-bis-alkylene having 8–14 carbon atoms or alkylene having 4–8 carbon atoms.

Particularly preferred are compounds of the formula (IV) wherein n is 1 or 2, $R_a$, $R_b$, $R_c$, and $R_d$ are methyl, and $R_e$ and $R_f$ are hydrogen, X is oxygen, $R^1$ is hydrogen, —O, alkyl having 1–4 carbon atoms, allyl or acetyl, $R^2$ is a hydroxybenzyl group of the formula (Va) or (Vb) wherein $R^6$ represents tert.butyl, $R^7$ represents methyl or tert.butyl and $R^8$ represents hydrogen or methyl, and $R^3$ represents alkyl having 1–18 carbon atoms, which is substituted by 1 or 2 groups —C(O)—OR$^{12}$, wherein $R^{12}$ represents alkyl having 1–4 carbon atoms or a group of the formula (VIa)

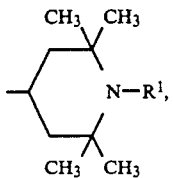

(VIa)

wherein $R^3$ represents allyl, propargyl, benzyl, phenyl, alkylene having 1–8 carbon atoms or xylylene.

Even more preferred is an antioxidant having the structure of formula (IV) wherein $R_a$, $R_b$, $R_c$ and $R_d$ are methyl, and $R_e$ and $R_f$ are hydrogen, $R_2$ represents a hydroxybenzyl group of the formula $R^2$, $R^3$ is n-butyl, $R^6$ and $R^7$ represent a tert-butyl group, n is 1, and X is —O—. The most preferred antioxidant is bis(1,2,2,6,6-pentamethyl-4-piperidinyl)-(3,5-di-tert-butyl-4-hydroxybenzyl)butylpropanedioate (available as Tinuvin 144 TM from Ciba-Geigy Corporation, Hawthorne, N.Y.).

The compounds used as stabilizers are generally used in an amount of from about 0.5 to about 3.0%, preferably 1.0% to 2.5%, by weight of the composition.

The following examples are presented to demonstrate this invention. They are not intended to be limiting. Therein, all percentages, parts, etc., are by weight unless otherwise indicated.

EXAMPLE 1

Into a glass container were added 100 parts dicyclopentadiene (DCPD) and 0.020 parts chloroplatinic acid. This mixture was vigorously stirred at 50° C. for 1 hour and, then, was cooled to 25° C. in a water bath. Next, 101 parts of methylhydrocyclosiloxanes (a mixture of predominantly 8, 10 and 12 membered ring siloxanes) was added to the vessel. After 12 hours of stirring at room temperature, NMR showed that all the reactive carbon-carbon double bonds of the DCPD were reacted.

The sample was split into five equal portions and bis(1,2,2,6,6-pentamethyl-4-piperidinyl)(3,5-di-tert-butyl-4-hydroxybenzyl)butylpropanedioate was added as a stabilizer (antioxidant), in varying amounts, to each sample (except the control). The antioxidant was blended into each sample until it was well dispersed and the samples were cured under nitrogen at 150° C. for 2 hours and, then, 275° C. for 2 hours.

The cooled samples were then tested using high pressure oxygen differential scanning calorimetry (DSC) at 180° C. under 550 pounds per square inch of oxygen pressure (an accelerated thermal aging environment) to determine the relative effectiveness of various levels of the antioxidant. Oxidation was detected via release of energy as heat by the sample (exotherm). This heat output was recorded as a function of time. The longer a sample took to reach its maximum exotherm, the more oxidatively stable it was.

Results are shown in the following Table.

TABLE

| Antioxidant (%[1]) | Time to Maximum Exotherm (minutes) |
| --- | --- |
| 0 | less than 1 |
| 0.5 | 18 |
| 1.0 | 20,23 |
| 1.5 | 36 |
| 2.0 | 32,40 |

[1]Percentage, by weight of the total polymer.

The above data show that compounds having both hindered phenol and hindered amine functionality are effective as stabilizers (antioxidants) for the polymers of this invention.

EXAMPLE 2

In this example, glass filled laminates were prepared using the prepolymers/polymers of this invention, and evaluated for degradation of flexural strength and dielectric strength at 180° C. over time.

Into a glass container were added 46.9 parts of methylhydrocyclosiloxanes (a mixture of predominantly 8, 10 and 12 membered ring siloxanes), 42.2 parts DCPD, 9.9 parts 5-vinyl-2-norbornene, 1.0 parts bis(1,2,2,6,6-pentamethyl-4-piperidinyl)(3,5-di-tert-butyl-4-hydroxybenzyl) butylpropanedioate as a stabilizer (antioxidant) and 150 ppm chloroplatinic acid as a complex with DCPD, and 25 parts hexane. The container was placed in a 25° C. water bath and stirred for 15–20 hours until all the reactive carbon-carbon double bonds of the DCPD and all the double bonds of the 5-vinyl-2-norbornene were reacted.

Additional catalyst (divinyl tetramethyl disiloxane platinum complex (PCO75, available from Huls America, Bristol, Pa.)) (25 ppm Pt) was added to the prepolymer solution to ensure that the prepolymer was fully catalyzed and would fully cure during lamination and post-cure.

The prepolymer solution was poured into a stainless steel container equipped with two bars above the container separated by shims 12 mils thick. Prepregs were prepared by pulling glass fabric through the resin solution and, then, between the bars (to remove excess prepolymer). They were then hung in an oven at 120° C. for 180 seconds and, subsequently, removed to cool.

Eight layer laminates were prepared by stacking prepregs prepared as above between Teflon film and aluminum caul plates, and placing the stack into a press at room temperature at 1,000 pounds per square inch. The press was heated to 165° C., held for an hour, and cooled slowly. The laminates were postcured under a nitrogen atmosphere at 220° C. for 4 hours.

Additional control samples were prepared in the same fashion, without using a stabilizer.

The laminates were cut into a number of 1 inch×3 inch samples so that flexural strength and dielectric strength could be measured. The samples were placed into a 180° C. forced air oven for the purpose of accelerating the oxidation of the samples. Every week the flexural strength of 5 samples and dielectric strength of 2 samples were measured. It took 77 days for the flexural strength of the laminate of this invention to degrade to 50% of its original value, whereas the control sample having no antioxidant degraded in less than 1 week. No degradation of dielectric strength was observed in the 77 day test period, whereas the control sample degraded in less than one week.

EXAMPLE 3

In this example, the stabilizer of this invention was compared with a number of different commercial stabilizers.

Prepolymer was prepared as in Example 1 and split into portions, to each of which (except the control) was added the antioxidant listed in the following Table. The level of stabilizer used was selected so that the sum of the equivalents of aromatic amines, hindered phenols and hindered amines was the same for each sample. The stabilizers were blended into the prepolymer, poured into small aluminum pans and cured under nitrogen at 150° C. for 2 hours, followed by postcure at 275° C. for 2 hours. The cooled samples were tested using high temperature DSC testing at 145° C. at 550 pounds per square inch of oxygen pressure. The results are shown below.

TABLE

| Sample | Antioxidant | Weight %[1] | Time to Maximum Exotherm (minutes) |
| --- | --- | --- | --- |
| A | None | — | 15 |
| B | Invention[2] | 0.64 | 125 |
| C | Santonox[3] | 0.50 | 50 |
| D | Irganox 1330[4] | 0.72 | —[5] |
| E | Irganox 3114[6] | 0.73 | —[5] |
| F | Ethanox 736[7] | 0.62 | 87 |
| G | DPPD[8] | 0.36 | 60 |
| H | Irganox 565[9] | 0.82 | —[10] |
| I | Phenothiazine[11] | 0.56 | 75 |
| K | Ethanox 702[12] | 0.59 | 27 |
| L | BHT[13] | 0.61 | 39 |
| M | Tinuvin 622[14] | 0.5 | —[5] |

[1]Percentage, by weight of the total polymer.
[2]Bis(1,2,2,6,6-pentamethyl-4-piperidinyl)-(3,5-di-tert-butyl-4-hydroxybenzyl)-butylpropanedioate.
[3]Santonox (available from Monsanto) having the following structure:

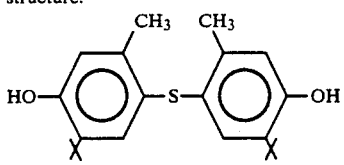

[4]Irganox 1330 (available from Ciba-Geigy Corporation, Hawthorne, New York) having the following structure:

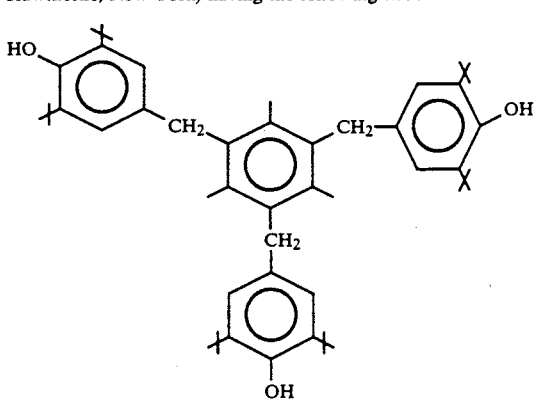

[5]Very brittle, not tested.
[6]Irganox 3114 (available from Ciba-Geigy Corporation) having the following structure:

TABLE-continued

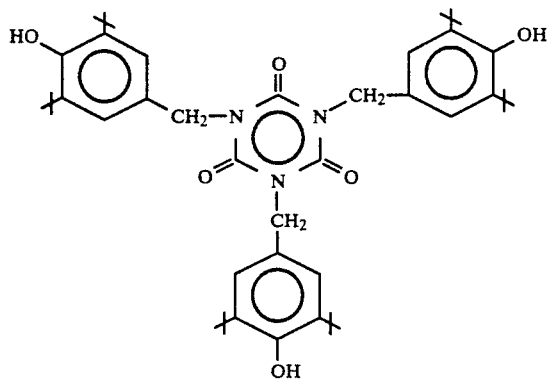

[7]Ethanox 736 ™ (available from Ethyl Corporation) having the following structure:

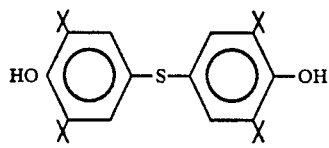

[8]Diphenyl phenylenediamine:

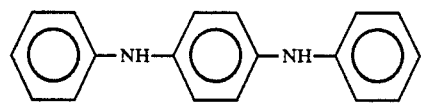

[9]Irganox 565 (available from Ciba-Geigy Corporation, Hawthorne, New York) having the following structure:

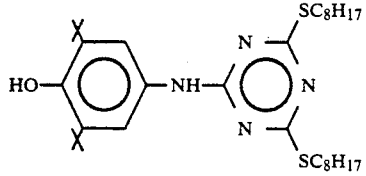

[10]Did not cure.
[11]Phenothiazine:

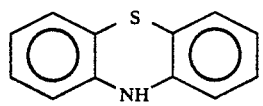

[12]Ethanox 702 ™ (available from Ethyl Corporation):

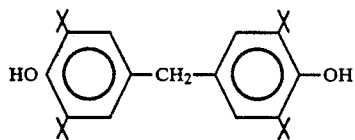

[13]Butylated hydroxytoluene (also known as 2,6-di-tert-butyl-4-methylphenol):

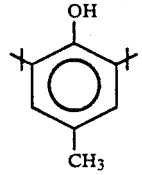

[14]Tinuvin 622 ™, an oligomeric hindered amine, available from Ciba-Geigy Corporation, Hawthorne, New York.

The sample containing the stabilizer of this invention had significantly longer time to maximum exotherm than any of the samples. This shows that compounds having both hindered amine and hindered phenol functionality are better as stabilizers (i.e., are better at preventing oxidation) for the organosilicon polymers of this invention than comparable compounds having aromatic amine functionality, or having only hindered amine or hindered phenol functionality.

EXAMPLE 4

In this example, the stabilizer of this invention was compared with a number of different commerical stabilizers. The samples were prepared as in Example 3 and were tested using high temperature DSC testing at 180° C. at 550 pounds per square inch of oxygen pressure. The results are shown below.

TABLE

| Sample | Antioxidant | Weight %[1] | Time to Maximum Exotherm (minutes) |
|---|---|---|---|
| A | None | — | 0.8 |
| B | Invention[2] | 0.64 | 31.0 |
| C | Naugard 76[3] | 1.46 | 27.4 |
| D | Agerite Stalite S[4] | 1.09 | 10.2 |
| F | Tinuvin 765[5] | 0.67 | 16.7 |

[1]Percentage, by weight of the total polymer.
[2]Bis(1,2,2,6,6-pentamethyl-4-piperidinyl)-(3,5-di-tert-butyl-4-hydroxybenzyl)-butylpropanedioate.
[3]Hindered phenol, available from Uniroyal Chemical Company, Inc., Middlebury, CT.
[4]Agerite Stalite S ™ (available from Vanderbilt) having the following structure:

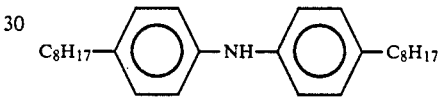

[5]Tinuvin 765 ™ (available from Ciba-Geigy Corporation, Hawthorne, New York) having the following structure:

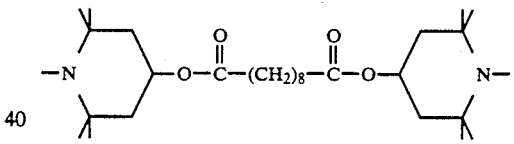

The sample containing the stabilizer of this invention had a longer time to maximum exotherm than any of the other samples. This shows that compounds having both hindered amine and hindered phenol functionality are better as stabilizers (i.e., are better at preventing oxidation) for the organosilicon polymers of this invention than comparable compounds having aromatic amine or only hindered amine or only hindered phenol functionality.

While the invention has been described with respect to specific embodiments, it should be understood that they are not intended to be limiting and that many variations and modifications are possible without departing from the scope and spirit of this invention.

What I claim is:
1. A composition comprising:
(A) (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites; or (ii) a crosslinked or crosslinkable linear poly(organohydrosiloxane) polymer having at least 30% of its ≡SiH groups reacted with hydrocarbon residues derived from polycyclic polyenes having at least two carbon-carbon double bonds in their rings; and (B) as an antioxidant, a compound comprised of at least one hindered phenol and at least one hindered amine.

2. A composition as claimed in claim 1 wherein the compound comprised of at least one hindered phenol and at least one hindered amine has the formula (IV):

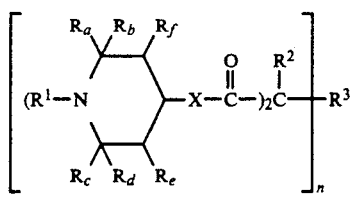

and an acid addition salt thereof, wherein n is 1 or 2, $R_a$ represents alkyl having 1-6 carbon atoms, $R_b$ represents alkyl having 1-6 carbon atoms, $R_c$ represents alkyl having 1-9 carbon atoms, phenyl, benzyl or phenylethyl, $R_d$ represents alkyl having 1-6 carbon atoms, or $R_c$ and $R_d$ together represent tetra- or pentamethylene, $R_e$ represents hydrogen, alkyl having 1-5 carbon atoms, alkenyl having 3-4 carbon atoms, alkynyl having 3-4 carbon atoms or aralkyl having 7-8 carbon atoms, $R_f$ represents hydrogen, alkyl having 1-5 carbon atoms alkenyl having 3-4 carbon atoms, alkynyl having 3-4 carbon atoms, or aralkyl having 7-8 carbon atoms, with $R_e$ and $R_f$ being mutually exchangeable, and X represents oxygen or —NR—, R represents hydrogen, alkyl having 1-18 carbon atoms, alkenyl having 3-4 carbon atoms, alkynyl having 3-4 carbon atoms, alkynyl having 3-4 carbon atoms, cycloalkyl having 5-12 carbon atoms, aryl having 6-10 carbon atoms, or aralkyl having 7-9 carbon atoms, $R^1$ represents hydrogen, —O—, alkyl having 1-12 carbon atoms, alkenyl having 3 or 4 carbon atoms, propargyl, benzyl or a group of the formula —CH$_2$—CH(OR$^5$)—R$^4$ wherein R$^4$ represents hydrogen, methyl or phenyl, and R$^5$ represents hydrogen or a group A—CO—, or R$^1$ represents a group A—CO—, and in both cases A represents alkyl having 1-12 carbon atoms, alkenyl having 2 or 3 carbon atoms, cyclohexyl, phenyl, benzyl, a phenyl or phenyl-ethyl group substituted by 2 alkyl groups each having 1-4 carbon atoms and a hydroxyl group, alkylamino having 1-12 carbon atoms, dialkylamino having 2-16 carbon atoms, anilino, alkoxy having 1-12 carbon atoms, benzyloxy or phenoxy, $R^2$ represents a hydroxybenzyl group of the formula (V)

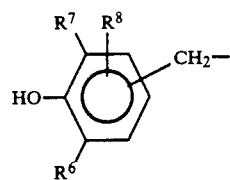

wherein $R^6$ and $R^7$ each independently represent an alkyl group having 1-9 carbon atoms, aralkyl having 7-9 carbon atoms or cycloalkyl having 5-8 carbon atoms, and $R^8$ represents hydrogen or methyl, and $R^3$ represents, in the case where n is 1, alkyl having 1-20 carbon atoms, or alkyl having 1-10 carbon atoms, which is substituted by at least one of the groups —OR$^9$, —CO—R$^{11}$, —CN, —C—(O—)—YR$^{12}$, —O—C(O)R$^{13}$ or —P(O)(OR$^{14}$)$_2$, wherein $R^9$ denotes phenyl or alkylphenyl having 7-10 carbon atoms, benzyl or cyclohexyl, $R^{11}$ denotes alkyl having 1-12 carbon atoms, Y denotes oxygen or —NR—, and R has the above-given meaning, $R^{12}$ denotes alkyl having 1-18 carbon atoms, cycloalkyl having 5-12 carbon atoms, or a group of the formula (VI)

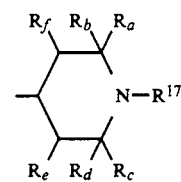

wherein $R^{17}$ has one of the meanings given for $R^1$, $R^{13}$ denotes alkyl having 1-17 carbon atoms, cycloalkyl having 5-12 carbon atoms, or phenyl or phenylalkyl having 7-9 carbon atoms, wherein thephenyl radical is unsubstituted or substituted by at least one of the groups alkyl having 1-4 carbon carbon atoms and hydroxyl, and $R^{14}$ denotes alkyl having 1-8 carbon atoms, allyl or phenyl, and X has the above-defined meaning, and $R^3$ further represents an alkyl group having 2-22 carbon atoms, which is interrupted by —O—, —SO— or —SO$_2$—, alkenyl having 3-18 carbon atoms, alkynyl having 3-8 carbon atoms, cycloalkyl having 5-12 carbon atoms, alkyl-cycloalkyl having 6-18 carbon atoms, cycloalkyl-alkyl having 6-14 carbon atoms, aralkyl or alkyl-aralkyl having 7-19 carbon atoms, phenyl, or a group —OR$^{15}$, wherein $R^{15}$ is alkyl having 1-18 carbon atoms, alkenyl having 3-4 carbon atoms, alkynyl having 3-4 carbon atoms, cycloalkyl having 5-12 carbon atoms or aralkyl having 7-9 carbon atoms, or $R^3$ represents a group —O—C—(O)R$^{16}$ or —NH—C(O)R$^{16}$, wherein $R^{16}$ is alkyl having 1-12 carbon atoms, alkenyl having 2 or 3 carbon atoms, cyclohexyl, phenyl, benzyl, a phenyl or phenylethyl group substituted by 2 alkyl groups each having 1-4 carbon atoms and a hydroxyl group, or $R^3$ is a group of the formula (VI) or of the formula (VII)

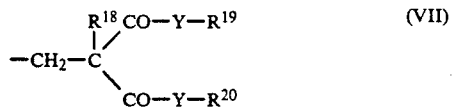

wherein R[18] represents alkyl having 1–20 carbon atoms, allyl, benzyl, phenyl, cyclohexyl, alkoxyalkyl-having 3–8 carbon atoms, or a group —O—C(O)R[16] or —NH—C(O)R[16] as defined above, or has one of the meanings given for R[2], and R[19] and R[20] each independently represent alkyl having 1–6 carbon atoms, or a radical of the formula VI, and, in addition, R[3] represents, in the case where n is 2, a direct bond, alkylene having 1–20 carbon atoms, alkylene having 2–20 carbon atoms, which is interrupted by one or two of the members —O—, —SO—, —SO$_2$— or CO—O—, arylene-bis-alkylene having 8–14 carbon atoms, alkenylene having 4–8 carbon atoms, or alkynylene having 4–8 carbon atoms.

3. The composition of claim 1 wherein the compound comprised of at least one hindered phenol and at least one hindered amine is bis(1,2,2,6,6-pentamethyl-4-piperidinyl)-(3,5-di-tert-butyl-4-hydroxybenzyl)butylpropanedioate.

4. A composition as claimed in claim 2 wherein the composition comprises a crosslinked organosilicon polymer or crosslinkable organosilicon prepolymer comprising alternating (a) cyclic polysiloxanes or siloxysilane residues and (b) polycyclic hydrocarbon residues derived from polycyclic polyenes having at least two carbon-carbon double bonds in their rings linked through carbon to silicon bonds (i).

5. A composition as claimed in claim 4 wherein the crosslinked organosilicon polymer or crosslinkable organosilicon prepolymer comprises residues derived from cyclic polysiloxanes.

6. A composition as claimed in claim 5 wherein the cyclic polysiloxanes are selected from the group consisting of tetramethyl cyclotetrasiloxane, pentamethyl cyclopentasiloxane, hexamethyl cyclohexasiloxane, tetraethyl cyclotetrasiloxane, cyclotetrasiloxane, tetraphenyl cyclotetrasiloxane, tetraoctyl cyclotetrasiloxane and hexamethyl tetracyclosiloxane.

7. A composition as claimed in claim 4 wherein the crosslinked organosilicon polymer or crosslinkable organosilicon prepolymer comprises residues derived from tetrahedral siloxysilanes.

8. A composition as claimed in claim 2 wherein the polycyclic hydrocarbon residues are derived from polycyclic hydrocarbon compounds selected from the group consisting of cyclopentadiene oligomers, norbornadiene, norbornadiene dimer, dimethanohexahydronaphthalene, bicycloheptadiene and its Diels-Alder oligomers with cyclopentadiene, and substituted derivatives of any of these.

9. A composition as claimed in claim 5 wherein the polycyclic hydrocarbon residues are derived from polycyclic hydrocarbon compounds selected from the group consisting of dicyclopentadiene, tricyclopentadiene, tetracyclopentadiene, norbornadiene, norbornadiene dimer, dimethanohexahydronaphthalene, bicycloheptadiene, and methyl dicyclopentadiene.

10. A composition as claimed in claim 2 wherein the polycyclic hydrocarbon residues are derived from polycyclic hydrocarbon compounds selected from the group consisting of dicyclopentadiene, methyl dicyclopentadiene and tricylopentadiene.

11. A composition as claimed in claim 5 wherein the polycyclic hydrocarbon residues are derived from polycyclic hydrocarbon compounds selected from the group consisting of dicyclopentadiene and tricylopentadiene.

12. A composition as claimed in claim 2 wherein the composition comprises a crosslinked or crosslinkable poly(organohydrosiloxane) derived from a poly(organohydrosiloxane) having the general formula:

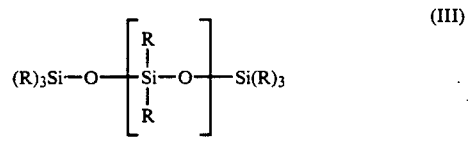

wherein R is a substituted or unsubstituted, saturated alkyl radical or a substituted or unsubstituted phenyl radical, and about 5% to about 50% of the R's are hydrogen and m is an integer from about 3 to 100.

13. A composition as claimed in claim 2, wherein the composition comprises a crosslinked organosilicon polymer or crosslinkable organosilicon prepolymer comprising residues derived from (a) a polyene having a molecular weight less than 500 having two non-aromatic carbon-carbon double bonds highly reactive in hydrosilation, the carbon-carbon double bonds being either in an alpha, beta or gamma position on a linear carbon moiety, next to two bridgehead positions in a strained polycyclic aliphatic ring structure, or in a cyclobutene ring; (b) a polycyclic polyene having two chemically distinguishable non-aromatic, non-conjugated carbon-carbon double bonds in its rings; and (c) a cyclic polysiloxane containing three or more SiH groups.

14. A composition a claimed in claim 2 wherein the ratio of carbon-carbon double bonds of (b) to hydrosilane groups in (a) is in the range of from about 0.5:1 up to about 1.2:1 and the alternating residues form a crosslinked thermoset structure.

15. A process of forming a crosslinked organosilicon polymer or organosilicon prepolymer comprising reacting a siloxane selected from the group consisting of linear poly(organohydrosiloxane)s, cyclic polysiloxanes or siloxysilanes with a polycyclic polyene having at least two carbon-carbon double bonds in its rings in the presence of a hydrosilation catalyst and, as an antioxidant, a compound comprised of at least one hindered phenol and at least one hindered amine.

16. The process as claimed in claim 15 wherein polymerization is promoted using a platinum catalyst.

17. The process as claimed in claim 16 wherein the antioxidant compound is bis(1,2,2,6,6-pentamethyl-4-piperidinyl)-(3,5-di-tert-butyl-4-hydroxybenzyl)butylpropanedioate.

18. A process of forming a crosslinked organosilicon polymer comprising curing a prepolymer which is the reaction product of (a) at least one of a cyclic polysiloxane or a tetrahedral siloxysilane and (b) a polycyclic polyene having at least two carbon-carbon double bonds in its rings in the presence of a hydrosilation catalyst and, as an antioxidant, a compound comprised of at least one hindered phenol and at least one hindered amine.

19. The process of claim 18 wherein the prepolymer is the partial reaction product of (a) and (b) having 30 to 70% of the reactive ≡SiH groups of (a) reacted, and (b) is a polycyclic polyene having at least two chemically distinguishable double bonds in its rings.

20. The process of claim 18 wherein the resultant polymer is a thermoset polymer and the prepolymer contains a large excess of carbon-carbon double bonds available for reaction with ≡SiH groups and additional cyclic polysiloxane or tetrahedral siloxysilane is added to the prepolymer.

* * * * *

UNITED STATES PATENT AND TRADEMARK OFFICE
CERTIFICATE OF CORRECTION

PATENT NO. : 5,025,048

DATED : June 18, 1991

INVENTOR(S) : Julia S. Burnier

It is certified that error appears in the above-identified patent and that said Letters Patent is hereby corrected as shown below:

Col. 6, line 64, "borene" should read -- bornene--;

Col. 17, line 39, "atoms" should read --atoms,--;

Col. 18, line 43, "...wherein thephenyl radical..." should read --...wherein the phenyl radical...--; and Col. 20, line 39, "A composition a claimed..." should read --A composition as claimed...--.

Signed and Sealed this

Seventh Day of September, 1993

Attest:

BRUCE LEHMAN

*Attesting Officer*          *Commissioner of Patents and Trademarks*